May 3, 1966 R. B. STILLMAKER 3,249,906
THERMOCOUPLE CONNECTOR
Filed March 8, 1965 2 Sheets-Sheet 2
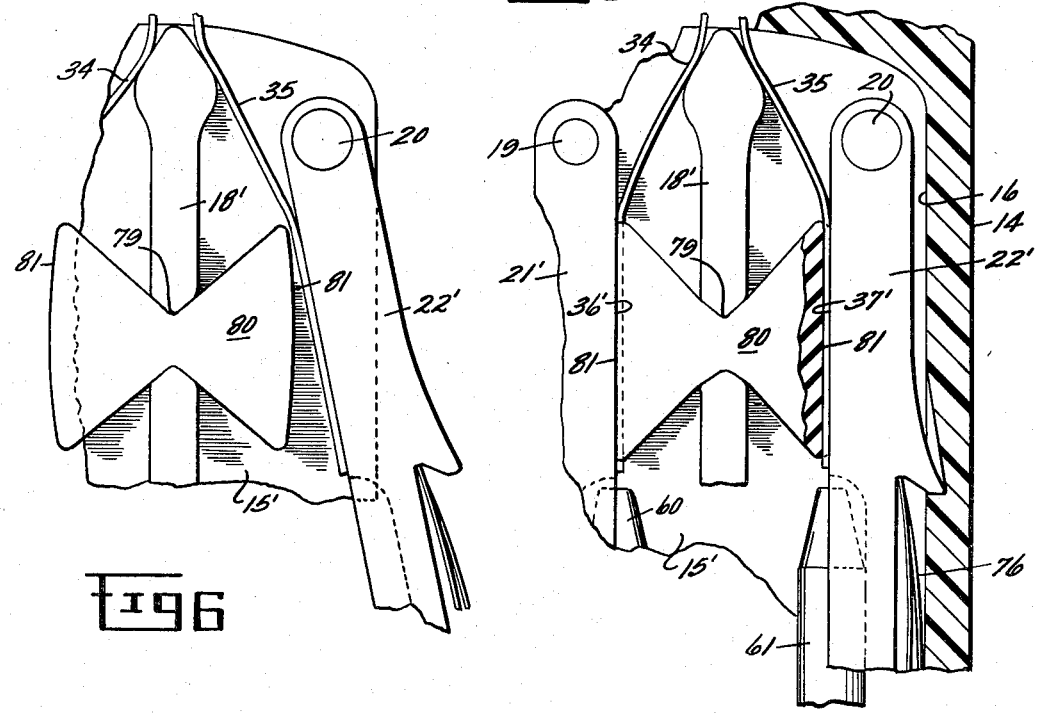
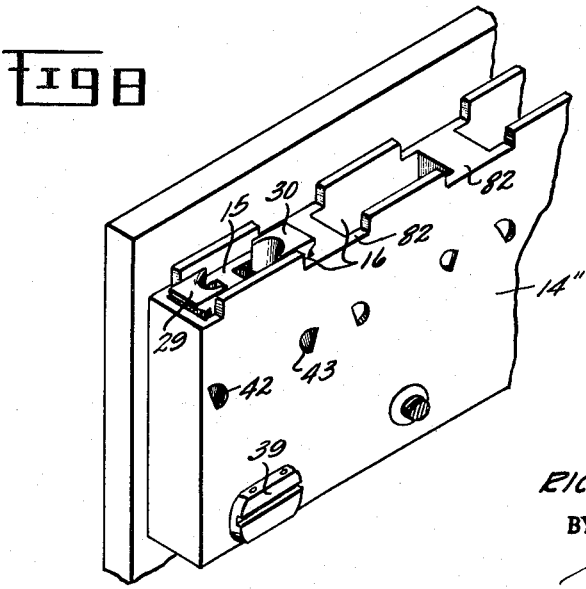
INVENTOR.
RICHARD B. STILLMAKER
BY
ATTORNEY United States Patent Office 3,249,906
Patented May 3, 1966

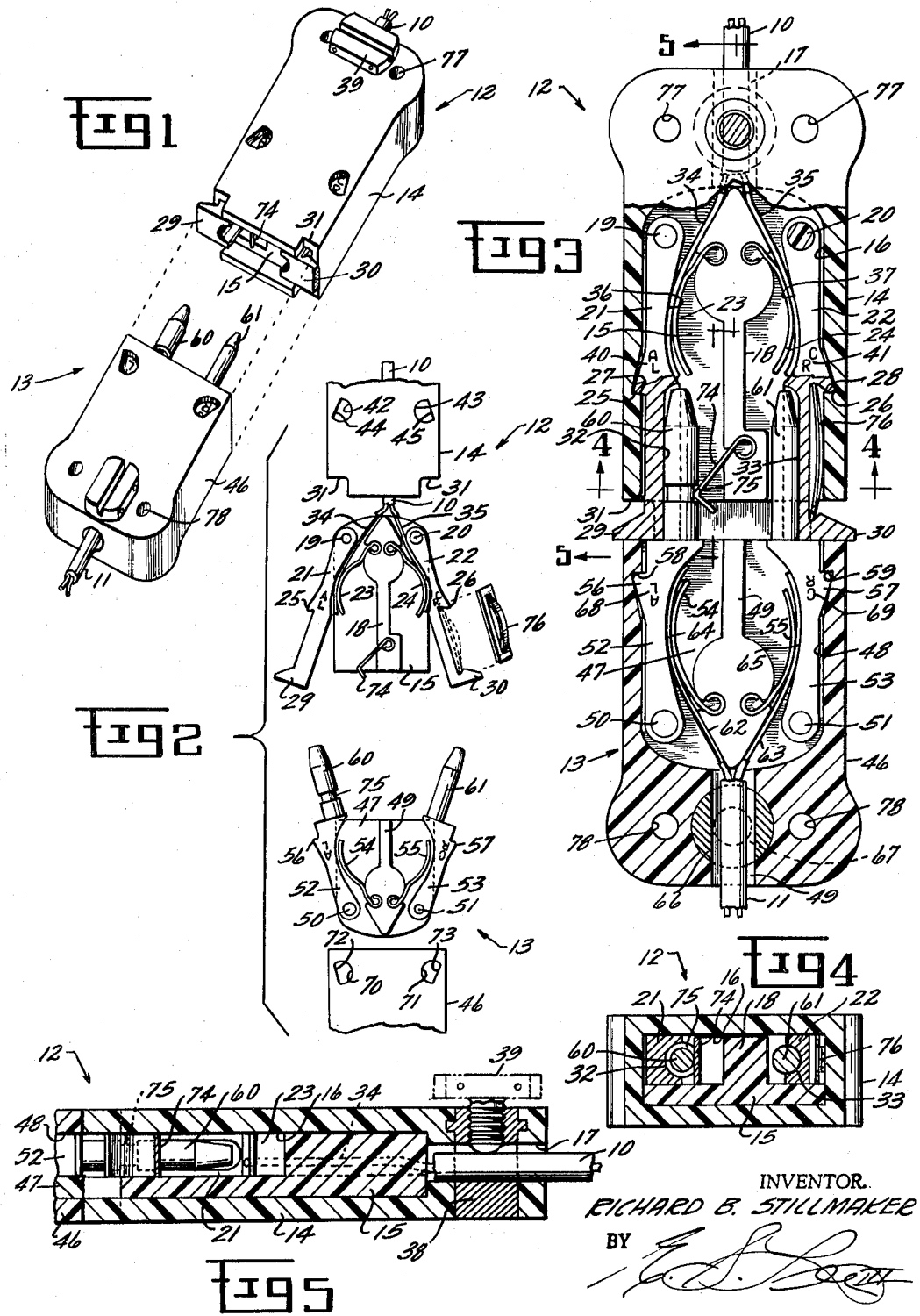

3,249,906
THERMOCOUPLE CONNECTOR
Richard Barnard Stillmaker, Cincinnati, Ohio, assignor to General Electric Company, a corporation of New York
Filed Mar. 8, 1965, Ser. No. 438,025
17 Claims. (Cl. 339—91)

The present application is a continuation-in-part of my copending application Serial No. 265,918 filed March 18, 1963, now abandoned.

This invention relates to improvements in electrical connectors and, though not limited in all aspects, more particularly to an improved electrical connector particularly suited to the unique requirements of effecting connections between thermocouple leads.

To explain the particular environment which motivated the present invention, it will first be pointed out that in making connections between thermocouple leads, great care must be exercised in assuring that the lead wires are at all times connected or in electrical contact only with identical metals. Otherwise, extraneous voltages may be generated which can destroy the accuracy of the temperature reading which is being made. Further, because of the extremely small voltages involved, it is of great importance that resistance losses in any connector used for this purpose be of an absolute minimum.

Another problem which is encountered is that in many instances the thermocouple connector is employed in an installation where severe vibration conditions exist, as in taking temperature measurements in a turbojet engine. In many instances the thermocouple lead wires are extremely thin, having a diameter of .010 inch or less. Any notching of or undue stress concentrations on these lead wires can and often does result in a fracture which requires making the connection anew.

Another problem is that thermocouple wires vary widely in diameter and while usually single stranded, can, at times, be multi-stranded. Thus a connector used for connecting thermocouple leads must be capable of readily accepting wires of various diameter, either single or multi-stranded.

Another factor of considerable importance is the need for a connector which may be readily installed and also reused. While, of course, thermocouple leads are often used in permanent or semi-permanent installations, perhaps their greatest use is in test equipment, where frequent changes must be made.

Prior connectors have failed to provide one or more of the above mentioned requirements. It has been the practice in the past, in many cases, to make these connections by use of threaded connectors; however, one prime disadvantage of such connectors is that the wires can be damaged and will fail or fracture, particularly under conditions of severe or even mild vibration. The connectors used today are also relatively expensive and complicated in assembly so that considerable time is required to make each connection to the connector.

Therefore, it is the object of this invention to provide a novel and improved electrical connector which is simple in construction and capable of rapid installation for varying sizes of wire, and, at the same time, forms a low resistance electrical contact.

Further, it is an object of the invention to enable the rapid assembly of a connector half to thermocouple lead wires and reduce the time conventionally accepted as being required.

A further object of the invention is to provide an electrical connector which minimizes, if not eliminates, the possibility of dissimilar metals being joined in making connections between thermocouple leads.

Yet another object of the invention is to provide a connector for thermocouple leads which is capable of installation on machines or under conditions subject to extreme vibration conditions without danger of failure because of such vibration conditions.

A further object of the invention is to reduce the cost of electrical connectors employed for purposes referred to.

In a preferred embodiment of the invention male and female connector halves are provided, with each connector half having resiliently biased elongated electrical contact surfaces and latching means as an integral part of male and female contact means. The contact means are biased against the resilient means by a casing into which they are inserted and held by the latching surfaces. Means are preferably provided for observing and identifying the particular metals with which electrical contact is being made, both during assembly and after assembly.

The above and other related objects and features of the invention will be apparent from a reading of the following description of the disclosure found in the accompanying drawings and the novelty thereof pointed out in the appended claims.

In the drawings:

FIG. 1 is a perspective view of a preferred embodiment of this invention, showing male and female connector halves joined to electrical cords prior to plugging the connector halves together;

FIG. 2 is a fragmentary disassembled view of both connector halves of the illustrated embodiment of the connector;

FIG. 3 is a partial cross-sectional view of the connector;

FIG. 4 is a section taken on line 4—4 in FIG. 3;

FIG. 5 is a section taken on line 5—5 in FIG. 3;

FIG. 6 is a fragmentary view of a portion of a connector half illustrating an alternate embodiment of the invention;

FIG. 7 is a fragmentary view of the embodiment seen in FIG. 6, illustrating its assembled condition; and FIG. 8 is a perspective view of a modified embodiment of the invention.

Referring first to FIG. 1, the present electrical connector comprises a female connector half 12 and a male connector half 13, to which electrical cords 10 and 11 are respectively joined or attached. In use the two halves of the electrical connector are simply telescoped together to effect an electrical connection as indicated by the dotted lines.

The female connector half 12 comprises a casing 14 and an insert member 15 which is removably received by a socket 16 of rectangular cross section (FIG. 4) formed in the casing 14. The socket 16 opens on one end of the casing 14 with access being provided to its inner end by a passage 17 in the opposite end of the casing 14. The insert member 15 comprises a base having a width approximating the width of the socket 16 and a central integrally formed rig 18 having a height, in combination with the base, approximating the height of the socket 16 thereby dividing the socket 16 into separate chambers when the insert member is inserted therein. The insert member is also provided with a pair of integrally formed pins 19 and 20 on opposite sides of the central rib 18.

The casing 14 and the insert member 15, as thus far described, are formed of a suitable insulative material such as hard rubber or a phenolic resin and are advantageously molded for greatest economy.

A pair of contact members 21 and 22 are respectively pivotally mounted on the pins 19 and 20. Leaf springs 23 and 24 are anchored in an enlarged portion of the central rib 14 and are electrically separated thereby. As will be evident from a comparison of FIGS. 2 and 3, these leaf springs are deflected when the insert member 15 is telescoped into the socket 16. When fully inserted, detent means comprising spurs 25 and 26 engageable with notches 27 and 28 respectively, securely hold the insert member in place. Ears 29 and 30 are respectively formed on the outer ends of the contact members 21 and 22 and access thereto is provided by notches 31 formed in the casing 14 so that the contact members may be deflected toward each other to release the detent means and permit ready removal of the insert member 15 from the casing 16. The contact members 21 and 22 also have semicircular grooves 32 and 33 formed respectively on the inner surfaces of their outer end portions for cooperatively receiving the male half of the connector.

To assemble or join the electrical cord 10 to the female connector half 12, the insert member 15 is removed as indicated in FIG. 2. The conductor 10 is threaded through the passage 17 and also through the socket 16. Presuming that the electrical cord 10 extends either to a thermocouple or to an instrument for employing the voltage generated by a thermocouple, the cord will comprise a pair of leads 34, 35. The ends of the leads are stripped to bare metal and lead 34 is inserted between the spring 23 and the contact member 21 and the lead 35 is inserted between the spring 24 and the contact member 25. The contact members are free to swing away from the springs so that a minimum of dexterity is required for this operation. The insert member may then be telescoped into the socket 16 and the excess cord 10 withdrawn through the opening 17. As this occurs, the contact members will be cammed inwardly (or they may be manually flexed inwardly) by engagement with the opposed surfaces of the socket 16. When the member 15 is fully inserted, the detent means will automatically lock it in place.

It will now be noted that the leads 34 and 35 are respectively deflected into engagement with elongated curved surfaces 36 and 37 on the contact members 21 and 22 respectively to make electrical contact therebetween. The free ends of the springs 23 and 24 have a similar but slightly more pronounced curvature and are formed so that they press against the leads 34 and 35 intermediate the contact length thereof with the surfaces 36 and 37 thereby applying a force or pressure maintaining contact between the lead wires and the contact members which is gradually applied and will not have any tendency to notch the leads or otherwise introduce stress concentrations which would cause a failure or fracture of the leads as a result of vibration. The firm pressure and long contact length provided maintain resistance losses to a minimum. It will also be noted that the springs 23 and 24 are in no way a part of the current carrying circuit. Another point to note is that the resilient force provided for maintaining electrical contact between the leads and the contact members in such that leads of various sizes may be accepted without modification or adjustment.

Not only must the electrical cord 10 be electrically joined to the connector half 12, as has been described, but it is also desirable that it be mechanically joined. To effect this end, a metal insert 38 is integrally molded as a component of the casing 14 and has a hole therethrough which defines in part the passage 17. A screw 39 is threaded through the insert 38 and firmly clamps the cord 10 at a point where stress concentrations have little or no likelihood of causing a failure.

As has been previously indicated, it is of great importance that dissimilar wires not be joined in effecting connections between thermocouple leads. The insulation for the individual leads 34, 35 is color coded and the contact members 21, 22 are provided with indicia 40, 41 respectively which enable a technician to make certain that the metal of the contact member matches that of the lead. Further, it will be noted that the pins 19 and 20 have different diameters so that the contact members 21 and 22 must necessarily be selectively mounted thereon. It will further be noted that the casing 14 is provided with openings 42, 43 which register with the indicia 40, 41 respectively when the insert member is telescoped into the socket 16. This enables the metals of the contact members to be readily identified when the connector is in use without the need of disassembling the connector.

It will also be noted that walls 44, 45 of the openings 39 are continuations of the detent notches 27, 28 respectively. This is an advantageous feature in that these notches may be economically formed by the use of insert pins in the molding of the casing 14.

Construction of the male connector half 13 is essentially the same as that of the female half 12 and, therefore, the following description will be somewhat abbreviated.

The male connector half 14 comprises a casing 46 and an insert member 47 which is removably received in a socket 48 of rectangular cross section formed in the casing 46. The socket 48 opens on one end of the casing 46 with access being provided to its inner end by a passage 49 in the opposite end of the casing 46. The insert member comprises a base having a width approximating the width of the socket 48 and a central integrally formed rib 49 having a height, in combination with the base, approximating the height of the socket 48 thereby dividing the socket 48 into separate chambers when the insert member is inserted therein. The insert member is also provided with a pair of integrally formed pins 50 and 51 on opposite sides of the central rib 49. The casing 46 and insert member 47 are formed of a suitable insulative material.

A pair of contact members 52 and 53 are respectively pivotally mounted on the pins 50 and 51. Lead spring 54 and 55 are anchored in an enlarged portion of the rib 49 and are electrically separated thereby. When the insert member 47 is fully inserted in the socket 48, detent means comprising spurs 56, 57 engageable with notches 58, 59 securely hold the insert member in place. The outer ends of the contact members 52 and 53 comprise prongs 60 and 61 respectively.

Joining an electrical cord to the male connector half 13 follows the same procedures described in connection with the female connector half. This is illustrated in FIG. 3 wherein leads 62 and 63 are held in firm electrical contact with concavely curved surfaces 64 and 65 by the biased springs 54, 55 which likewise provide firm pressure and a long contact length which maintains resistance losses to a minimum without introducing stress concentrations which would cause a failure or fracture of the leads as the result of vibration or otherwise.

The casing 46 is likewise provided with a metal insert 66 with a screw 67 threaded therethrough to provide a mechanical connection with the electrical cord 11.

The contact members 52 and 53 are respectively provided with indicia 68, 69 to enable a technician to make certain that the metal of the contact member matches that of the thermocouple leads connected thereto. The pins 50, 51 are of different diameters, and the contact members are provided with corresponding holes so that they are selectively mounted thereon. The casing 46 is provided with openings 70, 71 which are respectively registered with the indicia 68 and 69 when the insert member is assembled in the casing. As in the female connector half, surfaces 72, 73 are aligned with the detent notches 58, 59 respectively to facilitate molding of the casing.

To further assure that dissimilar metals are not joined, the prongs 60 and 61 are of different diameters and are to be received only by the grooves 32 and 33 respectively of the female contact members 21, 22.

The male and female connector halves are joined simply by telescoping the prongs 60, 61 into the grooves 32 and 33. To prevent inadvertent separation of the connector halves, detent means are provided which comprise a leaf spring 74 anchored in the rib 18 of insert member 15 and engageable with a groove 75 formed in the prong 60.

To assure firm electrical contact between the prongs 60, 61 and the grooves 32, 33 a flat spring 76 is provided on the contact member 22. The spring 76 is captured and held in place between spur 26 and ear 30. The spring 76 normally spaces the grooves 32, 33 a distance somewhat less than the distance between the outer surfaces of the prongs 60, 61. When the connector halves are telescoped together, the tapered ends of the prongs displace the contact members outwardly against the resilient force of the spring 76 which is curved to engage the adjacent wall of the socket 16. This resilient force assures firm electrical contact with a minimum of resistance loss.

Another feature of the present connector, in addition to the advantages already described, is that either or both of the connector halves are capable of being mounted on a panel or other wall surface. Thus, it will be seen that holes 77 and 78 are provided in the casing 14 and 46 respectively for insertion of mounting screws therethrough.

FIGS. 6 and 7 illustrate an alternate embodiment of the invention wherein a different form of resilient means is employed to an electrical connection between the thermocouple leads and the contact members. This alternate embodiment involves a modification of only the portion of the insert member and the contact member shown in FIGS. 6 and 7. The remainder of the connector, whether it be the female half or the male half, may be as previously described. For sake of having a reference, the female connector is described.

An insert member 15' is provided and modified to the extent that the centrally raised rib 18' is formed with a notch 79 extending to the insert member base and defined at its opposite ends by V shaped portions. A non-conductive biasing member 80 is captured in the notch 79. The biasing member 80 preferably has a butterfly shape and is formed of an elastomeric material, preferably one having a high temperature resistance, such as silicone rubber. The opposed outer surfaces 81 of the insert member 80 may be convexly curved on a relatively large radius.

The contact members 21' and 22' are modified to the extent that the surfaces 36' and 37', facing surfaces 81 of the resilient member and with which the leads 34 and 35 make electrical contact, are flat.

FIG. 6 illustrates the manner in which the leads 34 and 35 are placed between the member 80 and the contact members 21' and 22' when the insert member is removed from the casing. Thereafter, upon insertion of the insert members 15', into the socket 16, the contact members 21', 22' are swung to the positions illustrated in FIG. 7. As this is done, the biasing member 80 is compressed to hold the leads 34, 35 in firm contact with the surfaces 36', 37'. It will be apparent that this arrangement likewise provides pressure on the thermocouple leads which is gradually applied without introducing any undue stress concentrations. In this connection, note will be taken that the butterfly configuration of the member 80 provides lesser force at the outer ends of the surfaces 81 which gradually increases toward the center thereof. Also, the convex curvature of the surfaces 81 may be employed alone or in this configuration to further contribute to this gradual application of a pressure.

FIG. 8 illustrates a modified embodiment of the invention wherein a casing 14" is provided with a plurality of sockets 16 which will respectively receive insert members 15 formed identically to those in FIGS. 1–5. Notches 82 are formed in the upper surfaces of the casing 14" to facilitate gripping of the ears 29, 30 in removing the insert members. Such an embodiment is advantageously employed in a control panel where it is desired to connect several thermocouples from various test positions to an instrument board where they may be conveniently read.

Having thus described the invention, what is claimed as novel and desired to be secured by Letters Patent is:

1. An electrical connector half comprising,
a hollow casing,
an insert member removably inserted within said casing through an open end thereof,
a pair of contact members on said insert member and electrically insulated from each other at all times,
resilient means engageable with said contact members,
said resilient means and said contact members being relatively movable when the insert is removed from the casing for the insertion of a pair of leads respectively therebetween,
the portions of said contact members engaged by said leads extending a substantial distance along the length of the leads and said resilient means being disposed to exert a pressure progressively applied at a low rate, preventing undue stress concentrations in the leads.

2. An electrical connector comprising,
a hollow casing,
an insulative insert removably fitting within said casing through an open end thereof,
two contact members arranged on and movable relative to said insert,
spring means urging each of said contact members against the wall of the casing, and disposed so that a pair of leads may be inserted between the associated spring means and contact members when the insert member is removed from the casing,
and locking means for releasably retaining said contact members and said insert member within said casing,
said contact members being cammed by walls of the casing, upon insertion of the insert member therein, against the action of the spring means to thus insure electrical contact between leads of various sizes and said contact members and spring means,
said insert member being insertable into said casing sufficiently to engage said locking means.

3. An electrical connector half comprising,
a casing,
an insert member removably fitting within said casing,
a contact member pivotally supported from said insert member,
said contact member positioned such that it contacts said casing when said insert member is fitted within said casing,
a spring supported on said insert member adjacent said contact member to abut said contact member and urge it toward said casing, and
interlocking means supported by said casing and contact member to maintain said insert member and the casing in interfitting relationship,
whereby contact with an electrical lead is made by insertion of the lead between said spring and contact member and said insert member inserted into said casing until said interlocking means engage.

4. An electrical connector as in claim 3 wherein the contact member has an elongated curved surface on the side contacted by said spring and
further wherein the spring is correspondingly curved and of a length coextensive with said curved surface for a substantial distance, whereby when said electrical lead is inserted therebetween, a substantial length of the lead may be firmly held in electrical contact with said contact member to thus minimize resistance losses in said connector.

5. An electrical connector comprising,
a hollow casing,
an insert member removably fitting within said casing through an open end thereof,
a contact member pivotally supported on said insert member such that it is engaged by said casing and pivoted thereby when said insert member is inserted into said casing,
a separate spring, supported on said insert member, for urging said contact member outwardly against a wall of said casing when said insert member is inserted in said casing,
locking means for releasably retaining said contact member and said insert member within said casing, and
a second opening in said casing for introducing an electrical lead into said casing between said spring and said contact member,
whereby said connector is mounted on said lead by the insertion of said lead between said contact member and said spring and the subsequent insertion of said insert member into said casing until said locking means are engaged.

6. An electrical connector, as in claim 5, wherein the contact member has an elongated curved surface on the side engaged by said spring, and
further wherein the spring is correspondingly curved and of a length coextensive with said curved surface for a substantial distance,
whereby when said electrical lead is inserted therebetween, a substantial length of the lead is firmly held in electrical contact with said contact member to thus minimize the electrical resistance loss in said connector.

7. An electrical connector comprising,
a male structure, said male structure comprising,
a casing,
an insert member removably fitting within said casing,
a contact pin pivotally supported from said insert member such that it contacts said casing when said casing and insert member are joined,
a spring supported adjacent and positioned to contact said contact pin when said casing and the insert member are joined,
locking means for releasably retaining said contact pin and said insert member within said casing,
a female structure, said female structure comprising,
a casing,
an insert member removably fitting within said casing,
a contact member pivotally supported from said insert member such that it contacts said casing when said casing and insert member are joined,
a spring supported adjacent and positioned to contact said contact member when said casing and the insert member are joined,
locking means for releasably retaining said contact member and said insert member within said casing,
said contact member being shaped to interfit with said contact pin to form an electrical connection between said male and female structures,
whereby electrical leads may be connected to said male and female structures by insertion of the leads between said contact member or pin and said springs and fitting said casing over said insert members.

8. An electrical connector half comprising,
a casing formed of insulative material and having a socket opening at one end and a passage extending through the opposite end into the socket to receive a thermocouple electrical cord,
an insert member formed of insulative material and having overall cross-sectional dimensions approximating those of the socket and removably insertable therein,
said insert member comprising a base portion and a central rib for dividing said socket into separate chambers,
a pair of pins projecting from said base respectively on opposite sides of said rib,
a pair of contact members respectively pivotally mounted on said pins,
a pair of leaf springs respectively anchored on opposite sides of said rib and electrically separated thereby,
said contact members having elongated concavely curved contact surfaces respectively facing said springs,
said leaf springs being correspondingly curved to a somewhat greater extent whereby a thermocouple cord having two leads may be drawn through said passage and the two leads respectively positioned between said contact surfaces and said leaf springs, said contact members being cammed upon insertion of the insert member into said casing socket to bias said springs and insure good electrical contact between the contact members and the leads without introducing undue stress concentrations in the leads, and
separate means for mechanically securing the electrical cord to the casing.

9. An electrical connector half comprising,
a casing formed of insulative material and having a socket opening at one end and a passage extending to the opposite end into the socket to receive a thermocouple electrical cord,
said socket being generally of rectangular cross section,
an insert member formed of insulative material and having overall cross-sectional dimensions approximating those of the socket and removably insertable therein,
said insert member comprising a base portion and a central rib for dividing said socket into separate chambers, said rib being positioned at the entrance of said passage into said socket, to provide a divider,
said insert member further comprising a pair of integrally formed pins projecting from said base respectively on opposite sides of said rib,
a pair of contact members respectively pivotally mounted on said pins,
a pair of leaf springs respectively anchored on opposite sides of said rib and electrically separated thereby,
said contact members having elongated concavely curved contact surfaces respectively facing said springs,
said leaf springs being correspondingly curved to a somewhat greater extent whereby a thermocouple cord having two leads may be drawn through said passage and the two leads respectively positioned between said contact surfaces and said leaf springs, said contact members being cammed upon insertion of said insert member into said casing socket to bias said springs and assure good electrical contact between the contact members and the leads without introducing undue stress concentrations in the leads,
said contact members having spurs on their outer surfaces,
said socket having, on opposite walls, notches for receiving said spurs to releasingly lock said inert member in said casing,
a metal insert bonded to said casing and defining in part said passage,
a screw threaded through said metal insert and clamping against electrical cord to provide a mechanical attachment of said cord to said casing.

10. An electrical connector half comprising,
a casing formed of insulative material and having a socket opening at one end and a passage extending through the opposite end into the socket to receive a thermocouple electrical cord,
an insert member formed of insulative material and having overall cross-sectional dimensions approximating those of the socket and removably insertable therein,
said insert member comprising a base portion,
a pair of pins projecting from said base portion, said pins being of different diameters,
a pair of contact members formed of different metals and selectively pivotable on said pins, and resilient means disposed between and engageable with said contact members,
said contact members being pivotal from said resilient means for the placing of the pair of leads of the electrical cord respectively therebetween when the insert member is removed from the socket,
said contact members being cammed towards said resilient means upon insertion of said insert member into said socket to bias the resilient means and firmly press the electrical leads into contact with said contact members,
indicia on each of said contact members identifying the material from which the contact members are formed,
said casing having windows which are registered with said indicia upon insertion of the insert member into said socket whereby the metal of said contact members may readily be identified without removal of the insert member from the casing.

11. An electrical connector half comprising,
a casing formed of insulative material and having a socket opening at one end and a passage extending through the opposite end into the socket to receive a thermocouple electrical cord,
said socket being generally of rectangular cross section,
an insert member formed of insulative material and having overall cross-sectional dimensions approximating those of the socket and removably insertable therein,
said insert member comprising a base portion and a central rib for dividing said socket into separate chambers,
a pair of pins projecting from said base respectively on opposite sides of said rib, said pins having different diameters,
a pair of contact members formed of different materials, one of said contact members having a bore selectively received by one of said pins and the other contact member having a bore selectively received by the other of said pins whereby the contact members are pivotally mounted thereon,
resilient means anchored by said rib,
said contact members having contact surfaces respectively facing said resilient means and pivotal therefrom for placing the leads of the electrical cord respectively therebetween when the insert member is removed from the socket,
said contact members being cammed upon insertion of the insert member into said casing socket to bias said resilient means and assure good electrical contact between the contact members and the leads,
said contact members having indicia formed thereon identifying the material from which they are formed,
detent means releasably locking said insert member relative to said casing when the insert member is inserted in said socket, said detent means comprising spurs formed on the outer surfaces of said contact members and notches formed on opposed surfaces of said socket which register with said spurs when the insert member is fully positioned in said casing, said resilient means causing said detent means to latch,
said casing having a pair of windows registering with said indicia when the insert member is inserted in said socket, said windows having edge portions aligned with said notches in said socket to facilitate molding of said casing.

12. A female electrical connector half comprising,
a casing formed of insulative material and having a socket opening at one end and a passage extending through the opposite end into the socket to receive a thermocouple electrical cord,
an insert member formed of insulative material and having overall cross-sectional dimensions approximating those of the socket and removably insertable therein,
said insert member comprising a base portion,
a pair of pins projecting from said base,
a pair of female contact members respectively pivotally mounted on said pins, said contact members terminating at said one end of said casing when the insert member is inserted therein,
resilient means disposed on the insert member between the contact members,
said contact members having elongated contact surfaces respectively facing said resilient means,
said contact members being pivotal from said resilient means for the placing of the leads of the electrical cord respectively therebetween when the insert member is removed from said socket,
said contact members being cammed, upon insertion of the insert member into said casing socket, to bias said resilient means and insure good electrical contact between the contact members and the leads of the electrical cord, and
detent means resiliently held into engagement by said resilient means for releasably maintaining said insert member in said casing when it is placed in said socket,
said female contact members having ears at their outer ends,
said casing being relieved to provide manual access to said ears enabling them to be gripped and forced together to release said detent means for removal of the insert member from the casing.

13. An electrical connector comprising,
a first connector half including,
a hollow casing,
an insert member removably inserted within said casing through an open end thereof,
a pair of contact members on said insert member and electrically insulated from each other at all times,
resilient means engageable with said contact members,
said resilient means and said contact members being relatively movable when the insert member is removed from the casing for the insertion of a pair of leads respectively therebetween,
a second electrical connector half comprising the elements recited in defining the first connector half,
the contact members of one of said connector halves having male prongs and the contact members of the other connector half having female portions for receiving said prongs when the two connector halves are joined, and
resilient means mounted on one of said connector halves and having a limited displacement for urging said prongs and said female receiving portions into firm electrical contact when the two connector halves are joined.

14. An electrical connector comprising,
a connector half including,
a casing formed of insulative material and having a socket opening at one end and a passage extending through the opposite end into the socket to receive a thermocouple electrical cord,
an insert member formed of insulative material and having overall cross-sectional dimensions approximating those of the socket and removably insertable therein,
said insert member comprising a base portion and a central rib for dividing said socket into separate chambers, a pair of pins projecting from said base respectively on opposite sides of said ribs, said pins having different diameters, a pair of contact members formed of different materials one of said contact members having a bore selectively received by one of said pins and the other contact member having a bore selectively received by the other of said pins whereby the contact members are pivotally mounted thereon, resilient means anchored by said rib, said pins having contact surfaces respectively facing said resilient means and pivotal therefrom for placing the leads of the electrical cord therebetween when the insert member is removed from the socket, said contact members being cammed upon insertion of the insert member into said casing socket to bias said resilient means and assure good electrical contact between the contact members and the leads, said contact members having indicia formed thereon identifying the material from which they are formed, detent means releaseably locking said insert member relative to said casing when the insert member is inserted in said socket, said detent means comprising spurs on the outer surfaces of said contact members and notches formed on opposed surfaces of said socket which register with said spurs when the insert member is fully positioned in said casing, said resilient means causing said detent means to latch, a second electrical connector half comprising the elements recited in defining the first connector half, one of said connector halves having male prongs formed on the outer ends of the contact member and projecting beyond the casing thereof, said prongs being of different diameters and tapered at their free ends, the other of said connector halves having opposed semicircular grooves for selectively receiving said prongs, said female contact members having ears at their outer ends, the casing of said female connector half being relieved to provide manual access to said ears enabling them to be gripped and forced together to release said detent means for the removal of said insert member from the casing, and a flat spring captured between the ear and spur of one of the female contact members and resiliently urging said contact member toward the other female contact member through a limited distance whereby when the prongs of the male contact members are inserted into the grooves of the female contact members, the flat spring is biased against the wall of the socket in the casing of the female connector half to assure good electrical contact therebetween.

15. An electrical connector half comprising, a casing formed of insulative material and having a socket opening at one end and a passage extending through the opposite end into the socket to receive a thermocouple electrical cord, an insert member formed of insulative material and having overall cross-sectional dimensions approximating those of the socket and removably therein, said insert member comprising a base portion and a central rib for dividing said socket into separate chambers, a pair of pins projecting from said base respectively on opposite sides of said rib, a pair of contact members respectively pivotally mounted on said pins, said rib having a notch formed therein defined by opposed "V" shaped portions thereof, a resilient nonconductive member having a butterfly outline anchored by said notch to mount same on the insert member, said resilient member having a width substantially greater than that of the rib and its outer surfaces gently convexly curved and facing opposed surfaces on said contact members, whereby the contact members may be swung away from said resilient member for the placing of the two leads of the electrical cord respectively between the opposing surfaces of said contact members and said resilient member when the insert member is removed from said socket, said contact members being cammed upon insertion of the insert member into said socket to deflect said resilient member and thereby insure good electrical contact between the contact members and the leads without introducing undue stress concentrations in the leads.

16. An electrical half comprising, a casing formed of insulative material and having a socket opening at one end and a passage extending through the opposite end into the socket to receive a thermocouple electrical cord, an insert member formed of insulative material and having overall cross-sectional dimensions approximating those of the socket and removably insertable therein, said insert member comprising a base portion and a central rib for dividing said socket into separate chambers, a pair of pins projecting from said base on opposite sides of said rib, a pair of contact members respectively pivotally mounted on said pins, said rib having a notch therein, a resilient member having a narrow central portion anchored by said notch to mount the same on the insert member, said resilient member having cantilevered portions extending from the portion received by said notch to its outer surfaces facing opposed surfaces on said contact members, whereby the contact members may be swung away from said resilient member for the placing of the two leads of the electrical cord respectively between the opposing surfaces of said contact members and said resilient member when the insert member is removed from said socket, said contact members being cammed upon insertion of the insert member into said socket to deflect said resilient member and thereby insure good electrical contact between the contact members and the leads without introducing undue stress concentrations in the leads.

17. An electrical connector half comprising, a casing formed of insulative material and having a socket, an insert member formed of insulative material and removably insertable into said socket, a pair of contact members on said insert member, resilient elastomeric means anchored on said insert member between said contact members, said contact members being displaceable from said elastomeric means for the facing of two leads of an electrical cord respectively between opposing surfaces of said contact members and said elastomeric means when the insert member is removed from said socket, said contact members being displaced upon insertion of the insert member into said socket to deflect said elastomeric means, said elastomeric means and said opposing surfaces of the contact members being cooperatively formed to provide a substantial contact length with said leads and to exert pressure which progressively increase at a relatively low rate to thereby insure good electrical contact between the contact members and the leads without introducing undue stress concentrations in the leads.

References Cited by the Examiner

UNITED STATES PATENTS

| | | | |
|---|---|---|---|
| 2,594,850 | 4/1952 | Benander | 339—196 |
| 2,997,687 | 8/1961 | Walter | 339—91 X |
| 3,097,905 | 7/1963 | Shearer et al. | 339—113 |

References Cited by the Applicant

UNITED STATES PATENTS

| | | |
|---|---|---|
| 1,645,650 | 10/1927 | Kirkman. |
| 1,890,484 | 12/1932 | Allenic. |
| 2,720,634 | 10/1955 | Hart. |
| 2,769,154 | 10/1956 | Greenbaum. |
| 3,083,344 | 3/1963 | Long. |

JOSEPH D. SEERS, *Primary Examiner.*

W. DONALD MILLER, *Assistant Examiner.*